WILLIAM H. PHILLIPS.
Improvement in Gates.

No. 124,508. Patented March 12, 1872.

Witnesses:
John Becker
Geo. W. Mabee

Inventor:
W. H. Phillips
per [signature]
Attorneys.

UNITED STATES PATENT OFFICE.

WILLIAM H. PHILLIPS, OF STAUNTON, INDIANA.

IMPROVEMENT IN GATES.

Specification forming part of Letters Patent No. 124,508, dated March 12, 1872.

Specification describing a new and useful Improvement in Self-Operating Gate, invented by WILLIAM H. PHILLIPS, of Staunton, in the county of Clay and State of Indiana.

Figure 1:
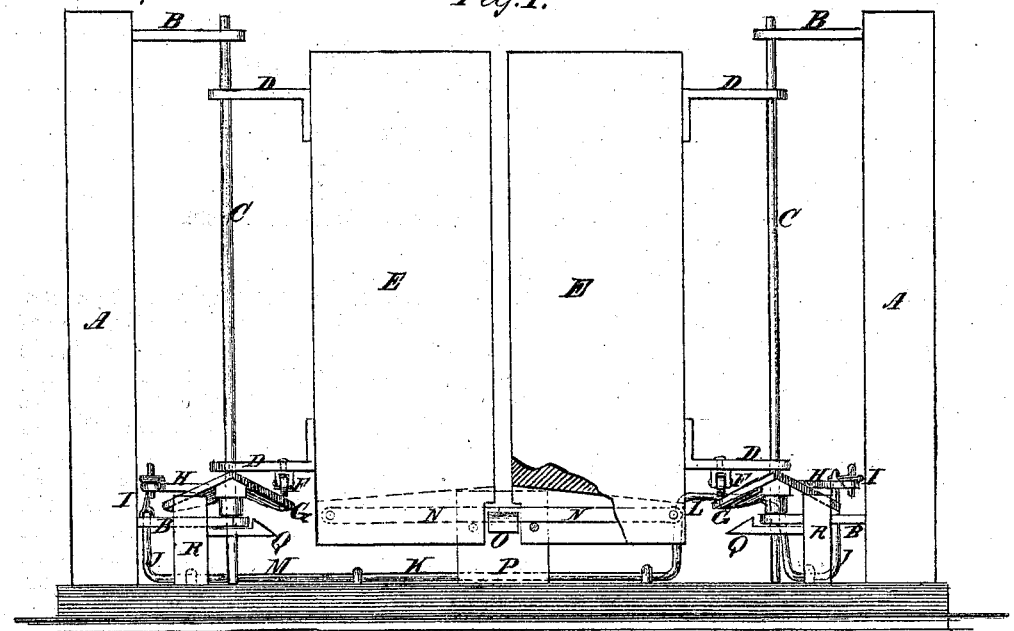
Figure 2:
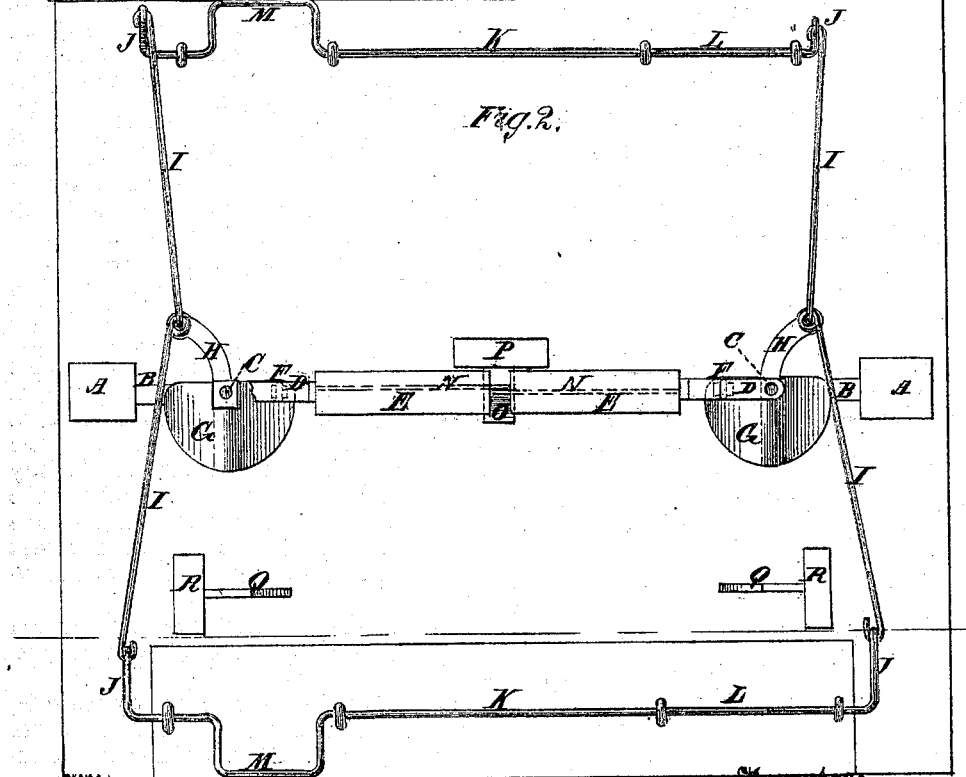

Figure 1 is a side view of my improved gate, parts being broken away to show the construction. Fig. 2 is a top view of the same, part being broken away to show the construction.

The invention will first be fully described and then clearly pointed out in the claim.

A represents the gate-posts, to the upper and lower parts of which are attached arms or brackets B, through the ends of which pass a vertical rod, C. The rod C also passes through the ends of the arms or brackets D attached to the gate E. The brackets or arms D are at a less distance apart than the brackets or arms B, so that the gate may have an up-and-down movement upon the rod C. The gate E may be made single or double, as may be desired. To the lower arm or bracket D of the gate E is attached a caster or friction-wheel, F, which rolls along the surface of the plate G. The plate G has a hole formed through it for the passage of the rod C, and rests upon a washer placed upon said rod C, said washer resting upon the lower arm or bracket B of the post A. The plate G is made in the form of a double incline, as shown in Figs. 1 and 2. The double-inclined plate G is so arranged that, when the gate is shut, the wheel F may rest upon the lowest part of one of the inclines, as shown in Fig. 2. With this construction, when the plate G is turned in the proper direction, the gate will be raised as the plate G passes further and further beneath the wheel F, so that, when the said wheel reaches the top or highest part of said plate G, the gate E will be raised sufficiently high to free it from the catches, so that, as the said highest part of the plate G has passed the said wheel F, the weight of the gate E will cause the wheel F to roll down the other incline of said plate G, opening the gate. In exactly the same way the gate may be closed by turning the plate G in the other direction. To the plate G is rigidly attached, or upon it is formed, an arm, H, to the outer end of which is pivoted the inner ends of two rods, I, which extend in opposite directions along the side of the roadway. The outer ends of the rods I are pivoted to the ends of crank-arms J formed upon the ends of the rods or bars K, which extend across the road-way, are pivoted to suitable supports set in the ground, and have each two cranks, L M, formed upon it in such positions that the vehicle about to pass through the gate-way may be so guided that the wheels may pass over one or the other of said cranks L M, as may be desired. The cranks L M are formed upon the rod K at right angles with each other, and the crank J is arranged midway between them, or at angle of forty-five degrees with each. The lower part of the gate E is provided with a latch, N, which, when the gate is swung shut, latches upon a catch, O, which, in the case of a double gate, is attached to a short post, P, set in the ground in the center of the roadway. In the case of a single gate the catch O may be attached to one of the posts, A. When the gate is swung open the latch N latches upon a catch, Q, attached to a short post, R, set in the ground in proper position at the side of the roadway.

By this construction, as a vehicle approaches the gate the driver guides the horses in such a way that the wheels may strike against the erect cranks M and force them down. This operates the plate G to open the gate, and, at the same time, raises the cranks L into an erect position, so that the driver, by guiding the horses so that the wheels of the vehicle may strike the erect crank L at the other side of the gate, may thus close the gate and, at the same time, raise the cranks M ready for the next vehicle in whichever direction it may be moving.

Having thus described my invention, I claim as new and desire to secure by Letters Patent—

The double-inclined and vibratory plate G, arranged on rod C, combined with the lower gate-hinge D, provided with roller F, all arranged to operate as and for the purpose set forth.

WILLIAM H. PHILLIPS.

Witnesses:
ALBERT WEBSTER,
DAVID HOFFMAN.